Patented Sept. 9, 1941

2,255,487

UNITED STATES PATENT OFFICE 2,255,487

SYNTHETIC RESINOUS COMPOSITIONS

Roy C. Feagin, Schenectady, and James G. E. Wright, Alplaus, N. Y., assignors to General Electric Company, a corporation of New York No Drawing. Application April 12, 1938, Serial No. 201,562

4 Claims. (Cl. 260—36)

This invention relates to synthetic resinous compositions, and particularly to compositions containing a polyvinyl halide, such, for example, as polyvinyl chloride.

Polyvinyl halides may be plasticized to form synthetic rubber-like compositions. The most common of such compositions is polyvinyl chloride plasticized with tricresyl phosphate. It can be used to insulate conductors, for example, by extrusion around a wire. While this composition is useful it has certain drawbacks. It darkens at elevated temperatures and while it may be flexible at ordinary temperatures it has limited elasticity.

According to the present invention, it has been found possible to materially improve the thermal stability, color and elasticity of the compositions of the type in question by the use of a particular class of organic compounds as plasticizers therefor.

This class of organic compounds are phenoxy propene oxides which are excellent plasticizers for polyvinyl halide compositions, prevent darkening of the product at elevated temperatures, and remarkably increase the elasticity of the compositions. For example, a composition prepared by pressing between flat steel plates at 150° C. for three hours 60% polyvinyl chloride and 40% phenoxy propene oxide by weight gives a very flexible, elastic, thermally stable composition. Again, a composition similarly made from 50% polyvinyl chloride and 50% phenoxy propene oxide and heated in an oven at 155° C. for fifteen hours yields a stable thermoplastic material of amber color.

A remarkable property of polyvinyl halide plasticized with phenoxy propene oxide is its rapid return after elongation. A composition containing 60% polyvinyl chloride and 40% phenoxy propene oxide pressed between plates at 150° C. and tested in a Scott tester at 30° C. was found to have a tensile strength of about 1100 lbs./sq. in. and an elongation of 338%. When pressed into a small, round ball the mass can be bounced like rubber.

It is possible to use the phenoxy propene oxide in conjunction with other known plasticizers for polyvinyl halides in order to stabilize and prevent darkening of the compositions under heat. For example, the following compositions were prepared by pressing the ingredients between flat steel plates at 150° C. for one hour:

|  | A | B | C |
| --- | --- | --- | --- |
|  | Percent | Percent | Percent |
| Polyvinyl chloride | 55 | 50 | 50 |
| Tricresyl phosphate | 40 | 40, | 35 |
| Phenoxy propene oxide | 5 | 10 | 15 |
| Color of product | Red | Lt. red | Amber. |

It will be observed that the thermal stability (as shown by the color of the product) increases with the increase in proportion of phenoxy propene oxide used.

Polyvinyl halide compositions plasticized with phenoxy propene oxide can be vulcanized in the presence of sulfur to give a product having the appearance and elasticity of vulcanized rubber. Thus a composition containing

| | Per cent |
| --- | --- |
| Polyvinyl chloride | 58 |
| Phenoxy propene oxide | 40 |
| Sulfur | 2 | was pressed for thirty minutes at 150° C. and on test at 30° C. showed a tensile strength of 1120 pounds/sq. in. and an elongation of 500%.

Other examples of compositions falling within the class of compounds noted above are secondary amyl phenoxy propene oxide and p-tertiary amyl phenoxy propene oxide. For example, using 60% polyvinyl chloride and 40% plasticizer in each case compositions were prepared by milling the ingredients for five minutes at 100° C., the mass being two mils thick. A very light colored flexible sheet was formed of each composition and samples of each were put into an oven at 155° C. Both compositions were well-stabilized thermally after several hours. The composition so prepared using secondary amyl phenoxy propene oxide as the plasticizer showed a tensile strength and elongation at 30° C. of 2373 lbs./sq. in. and 275%, respectively, while the composition using p-tertiary amyl phenoxy propene oxide as the plasticizer showed a tensile strength and elongation at 30° C. of 2385 lbs./sq. in. and 263%, respectively.

As in the case of phenoxy propene oxide the above-mentioned compounds may be used in conjunction with other plasticizers and also may be vulcanized with sulfur. For example, using 2% sulfur, 58% polyvinyl chloride and the remainder plasticizer, the compositions may be milled at 90° C. for four minutes using a mass 1.8 mils thick, after which they may be pressed into sheets at 150° C. for four hours. A composition so prepared using secondary amyl phenoxy propene oxide had a tensile strength and elongation at 30° C. of 2145 lbs./sq. in. and 404%, respectively. A similarly made composition using p-tertiary amyl phenoxy propene oxide showed a tensile strength and elongation at 30° C. of 1919 lbs./sq. in. and 392%, respectively. It is thus seen that the use of sulfur in the combination effects an increase in elongation of the compounds which at the same time retain good tensile strength.

It will be apparent that the proportions of ingredients given in the examples are only illustrative in character and by no means limiting in scope. While tricresyl phosphate has been specifically mentioned as an example of another plasticizer which may be used in conjunction with the class of compounds utilized in the present invention, any of the known plasticizers for polyvinyl halides may be used including such as are mentioned, for example, in Semon Patent No. 1,929,453 of October 10, 1933.

What we claim as new and desire to secure by Letters Patent of the United States, is:

1. A solid synthetic resinous product consisting essentially of polyvinyl halide and an oxide of the class consisting of phenoxy propene oxide, secondary amyl phenoxy propene oxide and p-tertiary amyl phenoxy propene oxide, the product containing 50-60% by weight of polyvinyl halide and oxide in quantity sufficient to plasticize said polyvinyl halide and impart elasticity and thermal stability to said product.

2. A product according to claim 1 wherein the oxide is phenoxy propene oxide.

3. A product according to claim 1 wherein the oxide is secondary amyl phenoxy propene oxide.

4. A product according to claim 1 wherein the oxide is p-tertiary amyl phenoxy propene oxide.

ROY C. FEAGIN.
JAMES G. E. WRIGHT.